United States Patent [19]

Kitahori et al.

[11] Patent Number: 5,124,867
[45] Date of Patent: Jun. 23, 1992

[54] ACTUATOR RETURNING AND HOLDING DEVICE FOR A DISK UNIT

[75] Inventors: Hiroki Kitahori, Sagamihara; Toshiaki Komatsuzaki, Tokyo; Yoshimi Masuda, Yokohama, all of Japan

[73] Assignee: International Business Machines Corporation, Armonk, N.Y.

[21] Appl. No.: 732,950

[22] Filed: Jul. 19, 1991

Related U.S. Application Data

[63] Continuation of Ser. No. 479,121, Feb. 13, 1990, abandoned.

[30] Foreign Application Priority Data

Feb. 14, 1989 [JP] Japan .................... 1-32598

[51] Int. Cl.⁵ .................. G11B 5/54; G11B 21/12; G11B 21/22
[52] U.S. Cl. ................................ 360/105; 360/75

[58] Field of Search .................... 360/105, 106, 75

[56] References Cited

U.S. PATENT DOCUMENTS 4,816,942  3/1989  Tanishima et al. ............ 360/75
4,903,157  2/1990  Malek ............................ 360/75

FOREIGN PATENT DOCUMENTS 63-48110  9/1988  Japan .

Primary Examiner—Robert S. Tupper
Attorney, Agent, or Firm—Richard E. Billion

[57] ABSTRACT

A ferromagnetic body is attached or embodied within the actuator arm in a disk drive. The ferromagnetic body is positioned so that the magnets of the voice coil motor attract the ferromagnetic body and produce a force to move the actuator arm so the read/write head attached thereto lands in the landing region of the disk in the event of a power interruption.

9 Claims, 5 Drawing Sheets

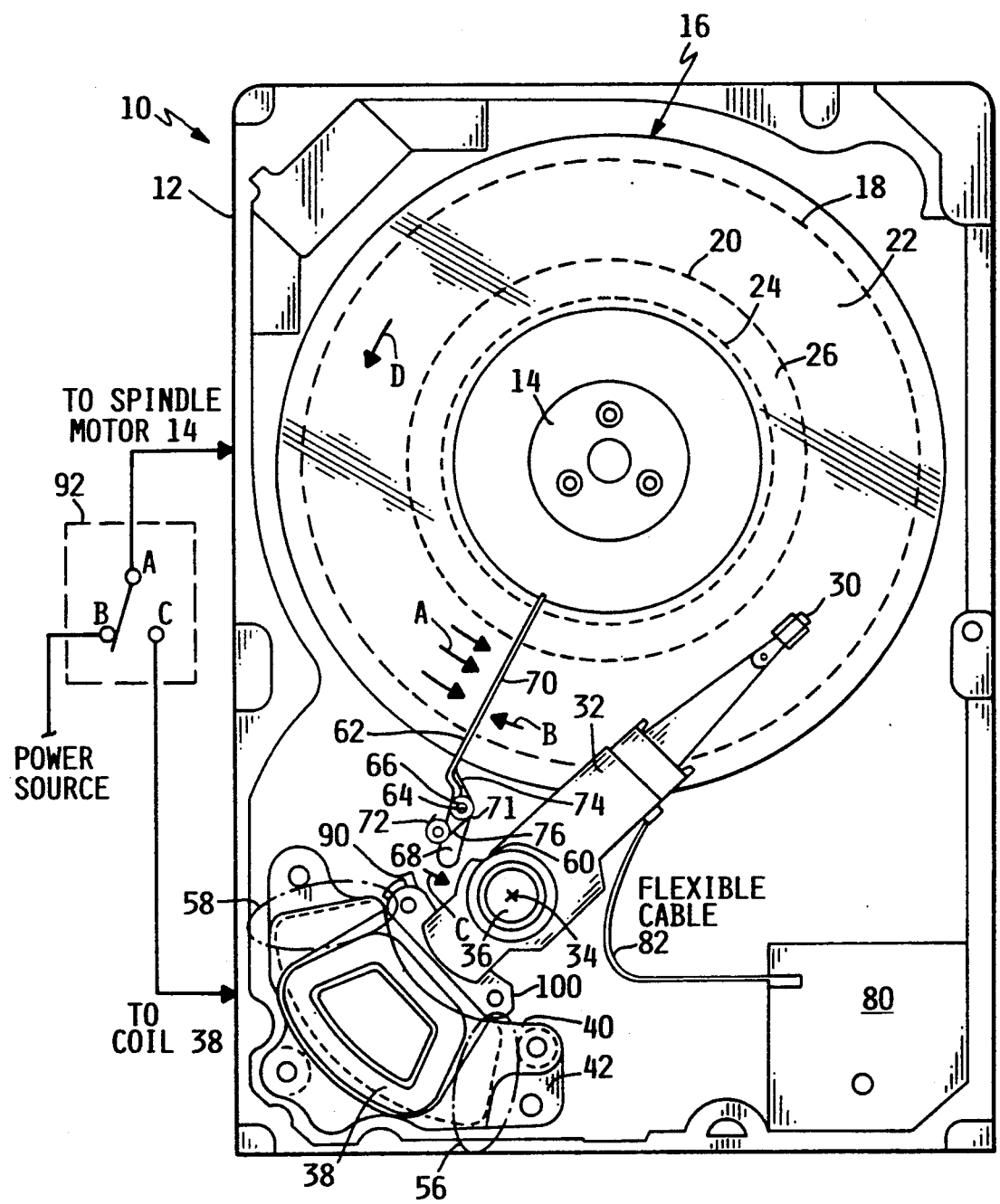
FIG. IA

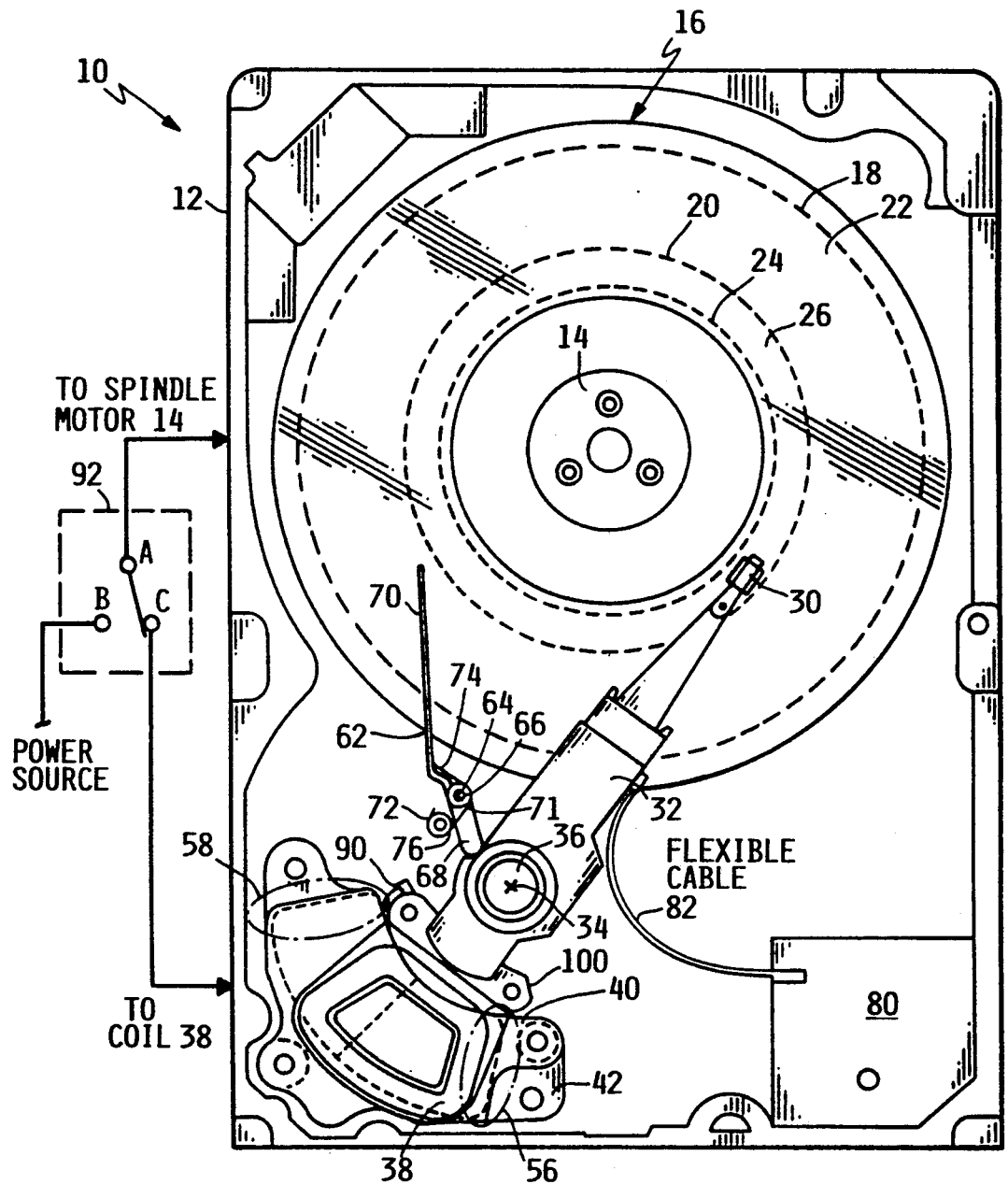
FIG. IB

ACTUATOR RETURNING AND HOLDING DEVICE FOR A DISK UNIT

CROSS REFERENCE TO RELATED APPLICATION

This application is a continuation of applicant's prior co-pending application, Ser. No. 07/479,121, filed Feb. 13, 1990, now abandoned.

FIELD OF THE INVENTION

The present invention relates to actuators within a data storage device or a disk drive more specifically, the present invention relates to an actuator returning and holding device when neither writing of data into the disk nor reading of data from the disk is performed, the device moves the tip of an actuator which carries a head to a landing region located outside a data recording region of a magnetic disk. The device also holds the head in the actuator position over the landing region.

BACKGROUND OF THE INVENTION

When the head is neither reading or writing data, it has a general practice for prevention of destruction of data recorded on a magnetic disk in a magnetic disk unit to move a head to a landing region located outside a data recording region on the disk and, stop the head there. Once the head is positioned outside the data region the actuator for supporting and moving the head is locked, so that the head will not enter into the data recording region even when an impact or vibration is applied from outside.

Since it is harder to make the disk float up at the inner part than at the outer part of the disk, the landing region is usually located at the inner-most part of a disk.

U.S. Pat. Nos. 4,647,997 and 4,692,829 disclose one device for moving the head to a non-recording region and locking the actuator arm. When the power supply is turned off in this device, the kinetic energy of the spinning disk and spindle is converted into electrical energy by operating the disk driving spindle motor as a generator. The electrical energy produced is supplied to the coil provided on an actuator, to move the actuator and the head to the landing region.

FIGS. 5A and 5B show the actuator returning and holding device of U.S. Pat. Nos. 4,647,997 and 4,692,829 which returns an actuator carrying a head to a landing region, when the head is not in use. Turning on switch 192 connects terminals A and B causing spindle motor 114, which drives a magnetic disk 116, to turn. The spinning disk 116 results in a wind in a definite direction inside a magnetic disk unit. A vane 170 is biased in the direction of S by a coil spring (not shown). The wind, however, causes vane 170 to rotate in the direction W, which allows latch finger 168 to separate from an actuator 132. In this way, the actuator 132 becomes free to move.

When power to the storage device is interrupted or when a power supply is turned off, switch 192 connects terminals A and C which connects voice coil 138 installed on the actuator 132 and the spindle motor 114. Due to inertia, the spindle motor 114 turns for a while after power has been interrupted. The turning of the spindle motor yields a counter-electromotive force. This counter-electromotive force induces current flow in the voice coil 138, causing the actuator 132 to rotate toward the center of disk 116. Consequently, head 130 carried by the tip of actuator 132 moves toward landing region 126 which is inside of the data recording region 122 on disk 116.

Since the counter-electromotive force decreases rapidly, it is impossible to move the head 130 to the landing region 126 using only the counter-electromotive force. As a result, the biasing force of flexible cable 182 is also used to move the actuator and the head to the landing region 126. When spindle motor 114 stops, the force of the wind on vane 170 weakens as well. The force of the coil spring (not shown) then causes latch finger 168 to come in contact with the actuator 132, to lock the actuator 132 in place (see FIG. 5B).

Published Japanese Examined Patent Application No. 63-48110 discloses a locking mechanism for holding a carriage at a definite position. Leakage fluxes produced by a magnetic circuit in a voice coil motor are used to attract a magnetic body mounted on the rear of the carriage.

Each of the devices mentioned has shortcomings. Among the shortcomings associated with the device shown in FIGS. 5A and 5B is that there is a possibility that the head 130 carried by the actuator 132 may not be moved to the landing region 126 after the power is shut off. Since the spindle motor's counter-electromotive force rapidly diminishes, the actuator 132 must be moved to the landing region 126 by the biasing force of the flexible cable 182. However, this biasing force gets smaller as the actuator 132 moves toward the inside of disk 116.

If the flexible cable 182 is made thicker so as to assure a biasing force sufficient to move the actuator and hold the actuator 132 inside the disk 116 or if the radius of the bow formed by the flexible cable 182 is made smaller, the force produced by the flexible cable 182 when the actuator is positioned at the outside of the disk 116, will become large, making the actuator 132 difficult to control.

The flexible cable 182 may also lose the biasing force as a result of repetitive bending in the seeking operation. Then the flexible cable 182 would no longer move the actuator nor hold the actuator 132 in place over the landing area 126. Current trends in disk drive products aggravate this result. Current trends are toward smaller disk drives with smaller enclosures. Smaller disk drives will require narrower flexible cables which produce smaller forces and which are more prone to repetitive stress.

Further, the biasing force of the flexible cable 182 tends to undergo changes as temperatures and moisture vary.

The locking mechanism disclosed by Published Examined Japanese Patent Application No. 63-48110 linearly moves the carriage which supports the head in motion to retract the carriage from the magnetic disk and, then, locks it. Among the problems associated with this locking mechanism is that it is impossible to reset the head to the landing region when the landing region is located inside the magnetic disk.

An object of the invention is to provide an actuator returning and holding device capable of returning a head carried by an actuator to a landing region and holding it over the region. Another object of the invention is to provide such a device using a smaller number of parts. Yet another object of the invention is to provide a device which requires no power consumption, even if the landing region is located near the center of the disk.

3

A further object of the invention is to provide an actuator returning and holding device in which the force an actuator receives, as it is moving through a data recording region of a disk, is nearly constant.

SUMMARY OF THE INVENTION

According to the invention, a ferromagnetic body is attached or positioned within an actuator in a disk drive. A magnetic circuit and a coil form a voice coil motor for turning the actuator on the specified axis. The magnetic circuit of the voice coil motor has regions of high or strong leakage flux. The ferromagnetic body is fixed on the actuator so that it will be moved into a strong leakage flux region as the head attached to actuator moves from a data recording region of the disk to a landing region of the disk.

In addition, a member, like the flexible cable used to carry signals to and from the head, is attached between the actuator and a frame, so that it applies a force to the actuator to move the head from data recording region of the disk to the landing region on the disk.

The invention also provides a latch which engages a notch in the actuator arm to keep the actuator arm positioned over the landing area until power is again provided to the disk storage unit.

BRIEF DESCRIPTION OF THE DRAWINGS

For a better understanding of the present invention, reference may be made to the accompanying drawings, in which:

FIG. 1A is a plan view of an actuator returning and holding device in a magnetic hard disk unit shown with its magnetic head carried by the actuator placed over the data recording region;

FIG. 1B is a plan view of an actuator returning and holding device in a magnetic hard disk unit shown with its magnetic head carried by the actuator placed over the landing region;

Figure 2:
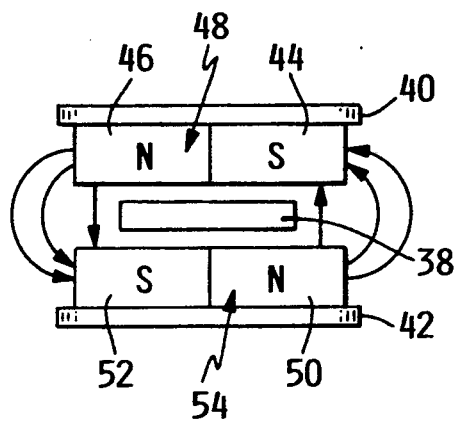
FIG. 2 is a diagram illustrating a composition of magnets, being a component element of a voice coil motor for driving the actuator shown in FIGS. 1A and 1B, and showing the leakage fluxes therefrom.
Figure 3:
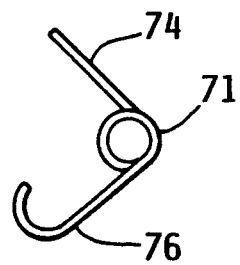
FIG. 3 is a plan view of a coil spring being a component element of the latch shown in FIGS. 1A and 1B.

These drawings are not intended as a definition of the invention but are provided solely for the purpose of illustrating the preferred embodiment of the invention described below.

DETAILED DESCRIPTION OF THE PREFERRED EMBODIMENT

FIGS. 1A and 1B show an embodiment of an actuator returning and holding device of a magnetic hard disk unit according to this invention. FIG. 1A shows a magnetic head 30 carried by an actuator 32 located over a data recording region 22. FIG. 1B the magnetic head 30 carried by the actuator 32 located over a landing region 26.

Referring to FIGS. 1A and 1B, a magnetic hard disk unit 10 includes a base 12. On the base 12, a spindle motor 14 is mounted (in FIGS. 1A and 1B, only the spindle of the spindle motor is shown). A magnetic rigid disk 16 is driven by the spindle motor 14. The disk 16 not only has a data recording region 22 between a concentric circle 18 and another concentric circle 20, but also has a landing region 26 between the concentric circle 20 and another concentric circle 24 inside the data recording region 22.

The head 30 for writing data into the disk 16 or for reading data from the disk 16 is mounted on one end of the actuator 32. The actuator 32 is mounted on the base 12 through a shaft 36, to be rotatable on an axis 34. A coil 38 is fixed on the actuator 32 at the end opposite the end to which the head 30 is mounted.

As shown in FIG. 2, over the coil 38, an upper yoke 40 is fixed to the base 12 at a specified distance between the base 12 and the coil 38. Below the coil 38, a lower yoke 42 is fixed to the base 12 at a specified distance between the base 12 and the coil 38. Mounted on the side of the upper yoke 40 toward the coil 38 is a permanent magnet 48 having an S pole 44 and an N pole 46. Fixed on the side of the lower yoke 42 toward the coil 38, is a permanent magnet 54 consisting of an N pole 50 facing the S pole 44 and an S pole 52 facing the N pole 46. FIGS. 1A and 1B show a region encircled by a dot and dash line 56 and a region encircled by a dot and dash line 58. These regions are exposed to heavy leakage fluxes from the permanent magnets 48 and 54. Of these two regions, the region utilized in the preferred embodiment is the one encircled by the dot and dash line 58. The region encircled by the dot and dash line 58 is near the end part on said opposite side of the actuator 32, thus, in the neighborhood of the position where the coil 38 is mounted and on the side of the disk 16, as seen from the actuator 32.

The coil 38, and the permanent magnets 48 and 54 cooperate to cause the actuator 32 to turn on the axis 34. Thus, the coil 38, and the permanent magnets 48 and 54 compose a voice coil motor, to produce a force from the current flowing in the coil 38 and the magnetic field produced by the magnets 48 and 54, thereby moving the actuator 32. The direction in which the actuator 32 moves is determined by the direction of the current flowing in the coil 38 and the magnitude of the torque applied to the actuator 32 may be determined by the amount of the current flowing through the coil 38.

On the side of the actuator 32 looking toward the disk 16 a notch 60 is formed. Adjacent to the notch 60, there is provided a latch 62, which together with the notch 60, hold the head 30 carried by the actuator 32 over the landing region 26.

The latch 62 is mounted on the base 12 through a shaft 66 to be rotatable on an axis 64. The latch 62 has a latch finger 68 on one side of the axis 64, and has on the other side of the axis 64 a vane 70, which receives the wind blowing in the direction of an arrows A produced by the turning of the disk 16. On the outer circumference of the shaft 66, a coil spring 71 is provided. A spring supporting post 72 is fixed on the base 12 near the shaft 66. The coil spring 71 has a first end 74 joined to the vane 70 and a second end 76 joined to the post 72 in order to give the latch 62 a biasing force which acts to move the vane 70 in a direction B opposite to the direction A of the wind produced, when the disk 16 turns in the direction of an arrow D. As the wind blowing in the direction of the arrows A has ceased, with the rotation of the disk 16 stopped, the latch finger 68 makes a turn in the direction of the arrow C due to the biasing force of the coil spring 71 to fit into the notch 60 in the actuator 32 which carries the head 30 located over the landing region 26, thereby holding the actuator 32 in that position.

An end of a flexible cable 82 extending from a circuit board 80 fixed to the base 12 is fixed to the actuator 32, such that its curvature will decrease, as the actuator 32 turns on the axis 34 so as to move the head 30 from the data recording region 22 to the landing region 26 of the disk 16. Accordingly, the force produced by the flexible cable 82 will gradually diminish, as the actuator 32 approaches the landing region 26. The flexible cable 82 transfers the data read from the disk 16 to the circuit board 80 in the form of electric signals and transfers the data outputted from the circuit board 80 to the head 30 in the form of electrical signals.

Attached to the actuator 32 is a ferromagnetic body 90 made of iron. The ferromagnetic body 90 is positioned so that the ferromagnetic body 90 will move to a region exposed to strong leakage fluxes from magnets 48 and 54, as the actuator 32 turns on the axis 34 so as to move the head 30 from the data recording region 22 to the landing region 26 of the disk 16. Thus the ferromagnetic body 90 is fixed in a position so that the arc drawn by the ferromagnetic body 90, as the actuator 32 turns while moving the head 30 toward the landing region 26 will intersect the region exposed to strong leakage fluxes which is encircled by the dot and dash line 58. Stated more specifically, the ferromagnetic body 90 is fixed at a specified position on the actuator 32 between the axis 34 and said opposite side end, and on the disk 16 side thereof.

When the magnetic hard disk unit 10 operates normally, the switch 92 connects the terminals A and B which energizes the spindle motor 14 to turn the disk 16. The spinning disk 16 produces the wind blowing in the direction of the arrows A which causes the latch finger 68 to turn in the direction opposite the direction of the arrow C and causes the latch finger 68 to come off the notch 60 in the actuator 32, allowing the actuator 32 to move freely, as directed by the current flowing through the coil 38. The head 30 carried by the actuator 32 is supported by an air bearing resulting from the turning of the disk 16, so that it is suspended above the surface of the disk 16.

When the power supply is turned off, the switch 92 connects the terminals A and $C_n$, whereby the coil 38 mounted on the actuator 32 and the spindle motor 14 are interconnected. The spindle motor 14 keeps turning for a while due to inertia, thereby generating a counter-electromotive force. This counter-electromotive force causes current to flow through the coil 38, thereby turning the actuator 32 toward the inside of the disk 16 from the data recording region 22 and toward the landing region 26. Moreover, when the head 30 carried by the actuator 32 is placed near the outside of the disk 16, a large force is produced by the flexible cable 82 which pushes the actuator 32 toward the landing region 26. The actuator 32 is significantly affected by this force as it turns toward the landing region 26.

As the head 30 approaches the inside of the disk 16, the counter-electromotive force generated by the spindle motor 14 attenuates and the force produced by the flexible cable 82 on the actuator 32 weakens, but since the ferromagnetic body 90 comes into the region exposed to heavy leakage fluxes which is shown encircled by alternate long and short dash line 58, the force of the magnets 48 and 54 attracting the ferromagnetic body 90 causes the actuator 32 to proceed inward over the disk 16. As the actuator 32 continues to rotate and move the head 30 nearer to the landing region 26, the ferromagnetic body 90 is exposed to heavier leakage fluxes. The heavier leakage fluxes produced by the magnets 48 and 54 result in a larger magnetic force attracting the ferromagnetic substance 90 attached to the actuator 32. When the head 30 has reached the landing region 26, the force from the leakage fluxes of the magnets 48 and 54 which attracts the magnetic substance 90 becomes maximum, with a result that the actuator 32 tends to move further inward. As a result, the notch 60 in the actuator 32 is positively engaged with the latch finger 68, which prevents the actuator 32 movement caused by the force of the coil spring 71 on the latch 62.

Figure 4A:
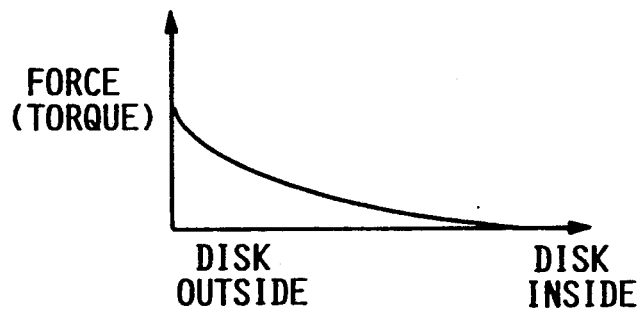
FIG. 4A is a graph showing the change in the force applied to actuator by the flexible cable as the actuator moves from the outside to the inside of the disk.
Figure 4B:
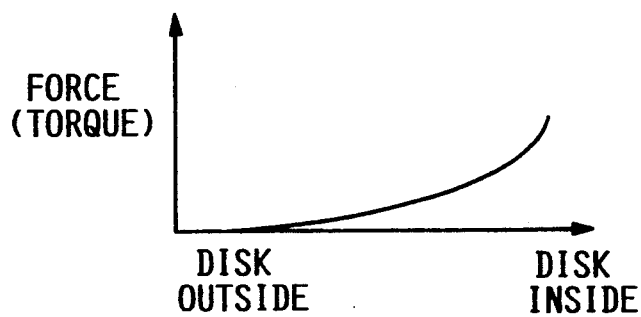
FIG. 4B is a graph showing the change in the magnetic force applied to the actuator which results from the leakage fluxes from the magnets attracting the ferromagnetic material attached to the arm, as the actuator moves from the outside to the inside.
Figure 4C:
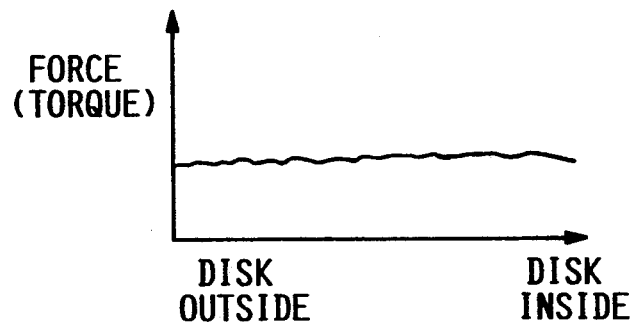
FIG. 4C is a graph showing the sum of the forces shown respectively in FIGS. 4A and 4B.
Figure 5A:
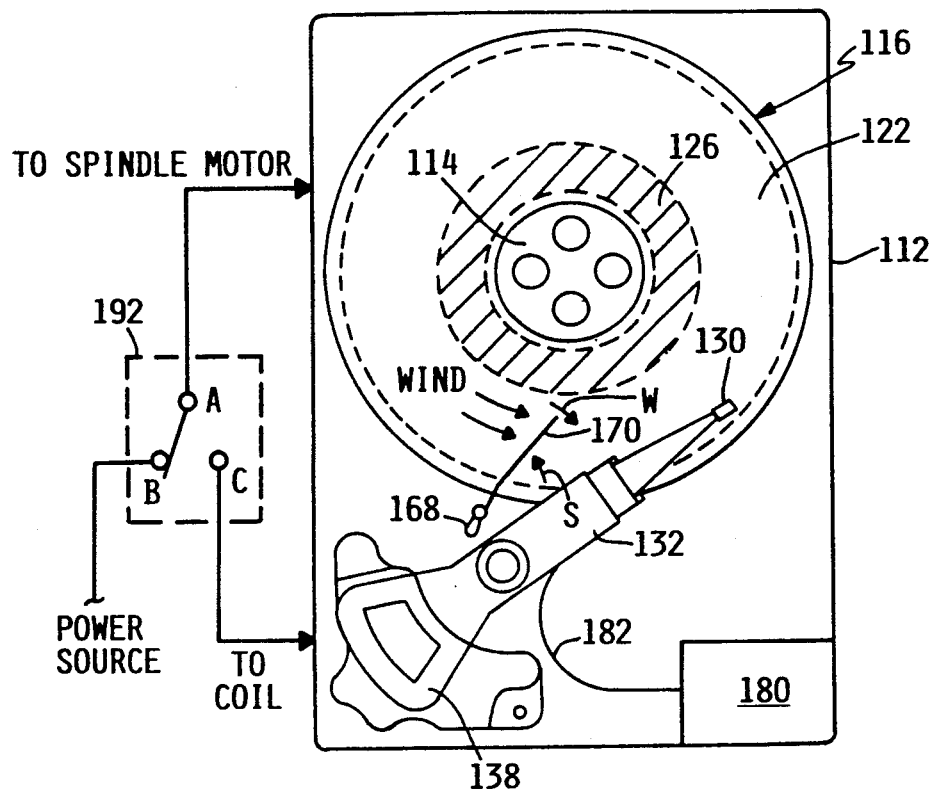
FIG. 5A is a plan view of a conventional actuator returning and holding device, shown with the head carried by the actuator placed over the data recording region.
Figure 5B:
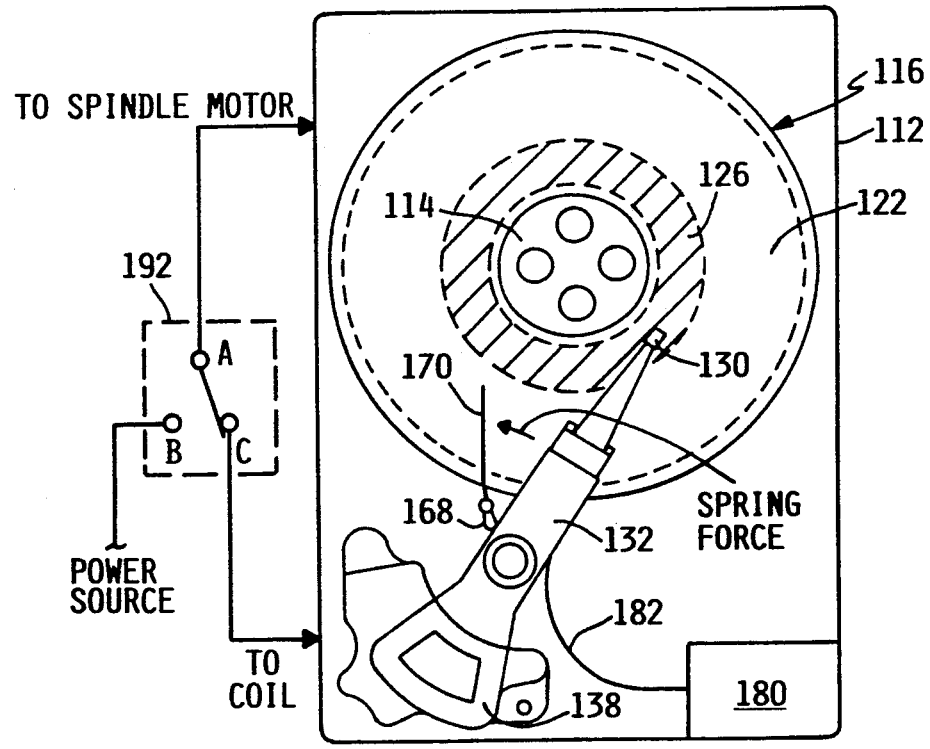
FIG. 5B is a plan view of a conventional actuator returning and holding device, shown with the head carried by the actuator placed over the landing region.

FIG. 4A shows the change in the force produced by the flexible cable 82 as the head 30 carried by the actuator 32 moves from the outside to the inside of the disk 16. As shown by this graph, the torque provided by the flexible cable 82 decreases, as the actuator 32 continues moving toward the inside of the disk 16, because of the diminishing curvature of the cable 82. FIG. 4B shows the change in the force resulting from the attraction of the ferromagnetic body 90 by the leakage fluxes from the magnets 48 and 54, as the head 30 carried by the actuator 32 moves from the outside to the inside of the disk 16. As shown by this graph, the force with which the ferromagnetic body 90 is attracted grows larger as the head 30 approaches the inside of the disk 16. FIG. 4C shows the sum of the force provided by the flexible cable 82 and the attractive force the magnetic body 90 receives from the leakage fluxes, when the head 30 carried by the actuator 35 moves from the outside to the inside of the disk 16. As indicated by this graph, the total biasing force the actuator 32 receives is nearly constant over the complete range of the data recording region 22, thus, facilitating the control of the actuator by means of a servo.

In the above embodiment, iron is used as the ferromagnetic body 90, but cobalt, nickel or their alloys, etc., may be employed. Any ferromagnetic substance which is attracted by leakage fluxes is usable. In the above embodiment, a flexible cable is utilized as the flexible member whose curvature decreases, as the actuator is turned on a specified axis so as to move the head from the data recording region to the landing region of the disk. It should be noted that if the use of such a cable is not possible, any flexible member which performs a function similar to this may be applied between the actuator and a specified portion on the disk unit.

Further, even if the landing region, which is provided on the inside of the disk, according to the above embodiment, is provided on the outside of the disk this invention may be similarly applied. In this arrangement, the magnetic body should be fixed at a position 100 on the actuator, so that the actuator moves the head from inside to the outside of the disk 16 as a result of attractive forces produced by strong leakage fluxes from the magnets. If a magnetic body is positioned at position 100, the arc the magnetic body will draw, as the actuator is turned so as to move the head toward the landing region outside the disk, will intersect the region exposed to strong leakage fluxes which is encircled by the dot and dash line 56. Thus the position 100 is a position on the actuator 32 between the axis 34 and said opposite side end, and on the side opposite to the disk 16.

This invention is also applicable to other disks including optical disks or magneto-optical disks, etc., and is not limited to magnetic disks.

Advantageously with this invention, even if the landing region is located on the inside of the disk, the head carried by the actuator may be returned to the landing region, to be held over said region, using only a small number of parts, without requiring power consumption.

In addition this invention provides the advantage of nearly equalizing the forces the actuator receives, while moving over the data recording region of the disk.

What we claim is:

1. An apparatus for storing data comprising:
   a housing;
   a disk mounted to said housing having a data recording region and a landing region;
   a rotary actuator pivotably mounted to said housing on an axis, said actuator having a first end and a second end;
   a head attached to one of said first and second ends of said actuator;
   a coil attached to the other of said first and second ends of said actuator;
   a magnetic circuit located near said coil, said magnetic circuit acting with said coil to move the actuator so said head attached to said actuator is moved to various selected positions over said disk;
   first means for moving said actuator toward the landing region; and
   second means for moving said actuator toward the landing region, said first and second means producing forces which vary as the actuator moves from a position away from the landing zone toward the landing zone, said first and second means acting to move said actuator to the landing region, said second means including a ferromagnetic body attached to said actuator so that it is attracted to a region exposed to strong leakage fluxes from said magnetic circuit so as to move the head attached to said actuator from a position over said data recording region to a position over said landing region when the head is neither reading or writing data on said disk, the attraction between said ferromagnetic body and the region exposed to strong leakage fluxes becoming stronger as the actuator moves toward the landing zone.

2. The apparatus of claim 1 wherein said ferromagnetic body is located on said actuator to produce a moment about said axis that moves the head in the direction of the landing region when the magnetic body is attracted to the region of strong leakage fluxes.

3. The apparatus of claim 1, wherein said first means for moving said actuator toward the landing region further comprises a member attached to the actuator arm at one end and to the housing at the other end, said member positioned so that is produces a moment about the axis so that the actuator is moved toward the landing region.

4. The apparatus of claim 3 wherein said member is a flexible cable for carrying signals to and from said head, said cable having a curve therein.

5. The apparatus of claim 2 wherein said first means for moving said actuator toward the landing region further comprises means for generating a current in said coil from the spinning of the disk, said current causing the actuator arm to move toward the landing region of the disk.

6. The apparatus of claim 1 wherein the ferromagnetic body is attached to said actuator such that an arc representing the path of travel of the ferromagnetic body as the ferromagnetic body rotates about the axis intersects said region of strong leakage fluxes.

7. The apparatus of claim 1 wherein the first means for moving said actuator and the second means for moving said actuator produce a substantially constant force on said actuator.

8. The apparatus of claim 1 wherein the landing region is located toward the center of the disk.

9. A method for positioning a head attached to a rotating actuator arm over the landing portion of a disk in a disk drive which has a magnetic circuit which is used to rotate the actuator arm, aid disk drive also having a flexible cable attached to said actuator arm and a portion of an actuator motor used to rotate the actuator attached to said actuator, said method comprising the steps of:
   determining areas near the magnetic circuit have a higher magnetic flux than other areas within the disk drive;
   attaching a ferromagnetic body to the actuator arm so that it intersects the area of higher magnetic flux when the head is over the landing region of the disk, said ferromagnetic body being drawn toward the area having the higher magnetic flux and causing the actuator arm to move toward the landing portion of the disk when the head is neither reading or writing data on the disk, the attraction between said ferromagnetic body and the area of higher magnetic flux becoming stronger as the actuator arm moves toward the landing region;
   attaching the flexible cable to said actuator so as to produce a force causing the head attached to the actuator to move toward the landing region of the disk; and
   producing a current in the actuator motor to move the head attached to the actuator to move toward the landing region of the disk.

* * * * *